United States Patent
Nedeltchev et al.

(10) Patent No.: US 9,357,410 B2
(45) Date of Patent: May 31, 2016

(54) WIRELESS NETWORK FLOW MONITORING

(71) Applicant: Cisco Technology, Inc., San Jose, CA (US)

(72) Inventors: Plamen Nedeltchev Nedeltchev, San Jose, CA (US); Aamer Saeed Akhter, Cary, NC (US); Balachander Chandrasekaran, San Ramon, CA (US); Eric Yu, Philadelphia, PA (US); Salman Asadullah, Campbell, CA (US); Michael P. O'Brien, Manasquan, NJ (US)

(73) Assignee: Cisco Technology, Inc., San Jose, CA (US)

( * ) Notice: Subject to any disclaimer, the term of this patent is extended or adjusted under 35 U.S.C. 154(b) by 200 days.

(21) Appl. No.: 14/016,463

(22) Filed: Sep. 3, 2013

(65) Prior Publication Data

US 2015/0063158 A1    Mar. 5, 2015

(51) Int. Cl.
*H04W 4/00* (2009.01)
*H04W 24/08* (2009.01)
*H04W 76/00* (2009.01)

(52) U.S. Cl.
CPC ............ *H04W 24/08* (2013.01); *H04W 76/00* (2013.01)

(58) Field of Classification Search
None
See application file for complete search history.

(56) References Cited

U.S. PATENT DOCUMENTS

| | | | |
|---|---|---|---|
| 6,760,861 B2 * | 7/2004 | Fukuhara et al. | 714/4.4 |
| 6,990,086 B1 | 1/2006 | Holur et al. | |
| 7,212,527 B2 * | 5/2007 | Shah et al | 370/389 |
| 7,305,492 B2 | 12/2007 | Bryers et al. | |
| 7,660,254 B2 | 2/2010 | Vasseur et al. | |
| 7,693,055 B2 | 4/2010 | Vasseur et al. | |
| 7,746,796 B2 | 6/2010 | Swallow et al. | |
| 7,765,294 B2 | 7/2010 | Edwards et al. | |
| 7,920,466 B2 | 4/2011 | Vasseur | |
| 8,045,531 B2 * | 10/2011 | Cheng et al. | 370/338 |
| 8,085,674 B2 | 12/2011 | Damm et al. | |
| 8,111,627 B2 | 2/2012 | McCallum et al. | |

(Continued)

FOREIGN PATENT DOCUMENTS

EP    2530892 A1    12/2012

OTHER PUBLICATIONS

Akhter, A., "User Traffic Analysis by Medianet Performance Monitor", http://blogs.cisco.com, Cisco Blog, Borderless Networks, Feb. 2011, 3 pages.

(Continued)

*Primary Examiner* — Steven H Nguyen
(74) *Attorney, Agent, or Firm* — Edell, Shapiro & Finnan, LLC (57) ABSTRACT

Techniques are presented herein for enabling performance monitoring of flows within a management and provisioning tunnel used for communicating packets between a wireless controller and wireless access point devices. A wireless controller that is configured to communicate with at least one wireless access point obtains a packet to be sent to the wireless access point for wireless transmission in a wireless network by the wireless access point. The wireless controller identifies, based on the packet, traffic session flow information associated with the packet. The wireless controller encapsulates the packet with a tunneling header that comprises the traffic session flow information and sends the encapsulated packet to the wireless access point. The tunneling header may also comprise an application identifier (ID) associated with the packet.

21 Claims, 7 Drawing Sheets

(56) References Cited

U.S. PATENT DOCUMENTS

| | | | |
|---|---|---|---|
| 8,116,252 B2* | 2/2012 | Balasubramanian et al. | 370/313 |
| 8,125,897 B2 | 2/2012 | Ray et al. | |
| 8,189,628 B2* | 5/2012 | Shaheen | 370/535 |
| 8,199,658 B2 | 6/2012 | Vasseur et al. | |
| 8,279,749 B2 | 10/2012 | Vasseur et al. | |
| 8,351,329 B2 | 1/2013 | Pignataro et al. | |
| 8,369,213 B2 | 2/2013 | Vasseur et al. | |
| 8,374,095 B2 | 2/2013 | Boutros et al. | |
| 2007/0268896 A1* | 11/2007 | Oyama et al. | 370/389 |
| 2008/0080507 A1 | 4/2008 | Swallow et al. | |
| 2008/0225853 A1* | 9/2008 | Melman et al. | 370/392 |
| 2009/0010271 A1* | 1/2009 | Bachmann et al. | 370/401 |
| 2009/0046577 A1* | 2/2009 | Marin | 370/219 |
| 2009/0086689 A1* | 4/2009 | Hunt et al. | 370/338 |
| 2009/0168788 A1* | 7/2009 | Den et al. | 370/401 |
| 2009/0225652 A1 | 9/2009 | Vasseur et al. | |
| 2009/0245149 A1* | 10/2009 | Xia et al. | 370/310 |
| 2010/0118711 A1 | 5/2010 | Cankaya et al. | |
| 2010/0118879 A1* | 5/2010 | Oulai et al. | 370/401 |
| 2011/0090794 A1* | 4/2011 | Cherian et al. | 370/235 |
| 2011/0149909 A1* | 6/2011 | An et al. | 370/331 |
| 2011/0317696 A1 | 12/2011 | Aldrin et al. | |
| 2012/0063314 A1 | 3/2012 | Pignataro et al. | |
| 2013/0083691 A1* | 4/2013 | Murphy et al. | 370/254 |
| 2013/0083700 A1* | 4/2013 | Sindhu et al. | 370/255 |
| 2013/0191628 A1 | 7/2013 | Nedeltchev | |
| 2013/0262651 A1* | 10/2013 | Shah et al. | 709/224 |
| 2013/0329557 A1* | 12/2013 | Petry et al. | 370/235 |
| 2014/0092723 A1* | 4/2014 | Murphy et al. | 370/221 |
| 2014/0092884 A1* | 4/2014 | Murphy et al. | 370/338 |
| 2014/0098762 A1* | 4/2014 | Ghai et al. | 370/329 |
| 2014/0105044 A1* | 4/2014 | Baillargeon | 370/252 |
| 2014/0105060 A1* | 4/2014 | Baillargeon | 370/253 |
| 2015/0036687 A1* | 2/2015 | Belling | 370/392 |

OTHER PUBLICATIONS

Akhter, A., "Mediatrace: A Better Traceroute that Does the Walking for You", http://blogs.cisco.com, Cisco Blog, Borderless Networks, Mar. 2011, 3 pages.

Kent, et al., "Security Architecture for the Internet Protocol", Network Working Group, Request for Comments 2401, The Internet Society, Nov. 1998, 67 pages.

Kent, et al., "IP Encapsulating Security Payload (ESP)", Network Working Group, Request for Comments 4303, The Internet Society, Dec. 2005, 44 pages.

Donnet, et al., "Revealing MPLS Tunnels Obscured from Traceroute", Computer Communication Review, vol. 42, No. 2, Apr. 2012, pp. 88-93, ACM SIGCOMM.

Finnie, et al., "Notification of Transmittal of the International Search Report and the Written Opinion of the International Searching Authority, of the Declaration", Patent Cooperation Treaty, International Application No. PCT/US2013/044237, mailed Oct. 22, 2013, 10 pages, European Patent Office, Rijswijk, Netherlands.

* cited by examiner

WIRELESS NETWORK FLOW MONITORING

TECHNICAL FIELD

The present disclosure relates to flow monitoring of wireless network traffic.

BACKGROUND

Networking devices in certain wired networks are configured to collect performance information from packets passing through the device. In this way, the networking devices can expose and/or calculate statistics for one or more of: capture jitter, roundtrip time (RTT), throughput, packet loss, etc. for use by a network administrator. For example, the administrator can use captured performance information to determine whether a wide area network (WAN) edge device or an enterprise is experiencing congestion. This helps network administrators to deploy media (data, voice and video) applications with pre-defined service level agreements, evaluate their performance characteristics and perform effective troubleshooting.

Wireless local area networks, such as Wi-Fi™ networks (e.g., Institute of Electrical and Electronics Engineers (IEEE) 802.11 networks) have ever increasing footprints, providing tremendous bandwidth and flexibility for end users. The growth of wireless networks has enabled mobility for an exploding number of end devices and has enabled new business models (e.g., Bring Your Own Device (BYOD), Work Your Way (WYW), etc.). However, wireless networks do not provide network administrators with the same performance monitoring and troubleshooting capabilities that are available in wired networks.

DESCRIPTION OF EXAMPLE EMBODIMENTS

Overview

Techniques are presented herein for enabling performance monitoring of flows within a management and provisioning tunnel used for communicating packets between a wireless controller and wireless access point devices. A wireless controller that is configured to communicate with at least one wireless access point obtains a packet to be sent to the wireless access point for wireless transmission in a wireless network by the wireless access point. The wireless controller identifies, based on the packet, traffic session flow information associated with the packet. The wireless controller encapsulates the packet with a tunneling header that comprises the traffic session flow information and sends the encapsulated packet to the wireless access point. The tunneling header may also comprise an application identifier (ID) associated with the packet.

Example Embodiments

Techniques are presented herein for obtaining per hop and per path performance information from packets encapsulated in accordance with the Control And Provisioning of Wireless Access Points (CAPWAP) protocol. More specifically, a CAPWAP type 3 header is provided that is designated for use with plain text as well as Datagram Transport Layer Security (DTLS) encapsulated traffic to enable per-hop and per-path performance monitoring. The techniques provided herein manipulate the CAPWAP header to accommodate Real-time Transport Protocol (RTP) header information that is used by a downstream network device or network analyzer to determine performance metrics for the network without decrypting the encrypted packet and without altering the content of the packet which can cause the packet to be dropped on arrival by the recipient device. This enables per-hop performance monitoring over Wi-Fi networks, as well as per-path (hop-by-hop) performance tracing capabilities over Wi-Fi networks.

Wireless networks are becoming more pervasive and greater numbers and types of access edge devices (access points or APs) are being used to serve the wireless networks. Typically, wireless networks operate in conjunction with one or more wired networks to deliver content to end user client devices (e.g., laptops, tablets, mobile phones, etc.). In the context of media (i.e., audio and/or video) content, devices within wired networks monitor Real-time Transport Protocol (RTP) flow information associated with the media content to identify performance issues. That is, the network elements in a wired network are configured to monitor the RTP flows to identify jitter, roundtrip time (RTT), and packet loss issues for subsequent use by an administrator.

Access point management and provisioning protocols used in conventional wireless networks have been largely designed to deploy and manage large numbers of access points. Currently, there is only minimal quality of service (QoS) control, with little or no per-hop or per-path troubleshooting tools. As a result, conventional wireless networks can only provide "best effort" type of services and cannot provide differentiated services for end users.

In operation, access point management and provisioning protocols enable a centralized wireless controller in a network to communicate with remote wireless access points via a provisioned "tunnel." As is well known, tunneling or port forwarding is the transmission of data intended for use only within a private network through a public network. Tunneling is generally done by encapsulating the private network data and protocol information using a header such that the private network protocol information appears to the public network as data. Tunneling allows the use of the Internet, which is a public network, to convey data on behalf of a private network. As such, a tunneling header that encapsulates the packet that is to be communicated. As described further below, a packet may be secured (i.e., authenticated and/or encrypted) or unsecured (i.e., plain text).

An example of a management and provisioning protocol that creates a tunnel between a wireless controller and access points is CAPWAP protocol. More specifically, CAPWAP is a standard interoperable protocol that enables a wireless controller to manage a collection of wireless access points, and uses User Datagram Protocol (UDP) ports 5246 (control channel) and 5247 (data channel). The state machine of CAPWAP is similar to that of the Lightweight Access Point Protocol (LWAPP), but with the addition of a full Datagram Transport Layer Security (DTLS) tunnel establishment. The CAPWAP standard provides configuration management and device management, allowing for configurations and firmware to be pushed to access points.

In certain circumstances, a wireless controller may use a CAPWAP tunnel (or other access point management and provisioning tunnel) to send, to a wireless access point, packets that may then be wirelessly transmitted by the access point in a wireless network. In general, the wireless controller and access point are connected via a wired network formed by a plurality of intermediate or in-path networking devices (e.g., routers, switches, etc.) Within conventional management and provisioning protocol tunnels (e.g., conventional CAPWAP tunnels), which can be encrypted, the in-path networking devices disposed between a wireless controller and an access point do not have any visibility into the traffic flows in the network. More specifically, the in-path networking devices can only access the tunneling header but not the information within the packet. This means flow monitoring can only be conducted at devices where the transmitted packet is accessible (e.g., where the packet is plain text, namely at the access point or at the wireless controller (i.e., the transmitting and receiving device)). However, the source of traffic loss or other issues can occur between different segments (e.g., between an access point and wireless client, between an access point and a branch edge device, between a branch edge device and a data center edge device, between a data center edge and a server, etc.) and is not discoverable through conventional techniques. In other words, when packets for transmission in a wireless network are sent from a wireless controller to a wireless access point using a CAPWAP tunnel (or other access point management and provisioning tunnel), conventional networks lack the ability to perform real-time monitoring on a per-hop or per-path (hop-by-hop) basis at multiple locations within the network connecting the wireless controller to the wireless access point. This makes performance control difficult in centralized controller-based architectures, particularly with media flows when there is a RTP traffic loss between controller and the access point.

Accordingly, presented herein are techniques to increase the visibility and quality of service parameters for data, audio, and video application packets sent over management and provisioning tunnel to access points for transmission in wireless networks. The techniques presented herein provide a new management and provisioning protocol header in which flow performance information is made to be visible and available for monitoring by in-path networking devices (e.g., switches, routers, etc.) in a network path between the wireless controller and the wireless access point. More specifically, techniques are presented herein to increase the visibility and quality of service parameters for data, voice and video applications by enabling Medianet capabilities in access point management and provisioning tunnels. Requirements of the intermediate layer 2 (L2) hubs are defined to execute performance monitoring and Mediatrace capabilities.

For ease of illustration, the wireless network flow monitoring capabilities will be described herein with reference to a modified CAPWAP tunneling header. In such specific examples, a non-0 or non-1 type of CAPWAP protocol header is proposed, referred to herein for simplicity as a CAPWAP type 3 header. Using the CAPWAP type 3 header, the CAPWAP protocol is able to deliver the functionality of performance monitoring at various hops and nodes. It is to be appreciated that the CAPWAP protocol is only an example and that the examples presented herein may be used with any other management and provisioning protocol now known or later developed (e.g., the Secure Device Provisioning protocol (SDP), the Extensible Provisioning Protocol (EPP), or any other provisioning protocol).

Figure 1:
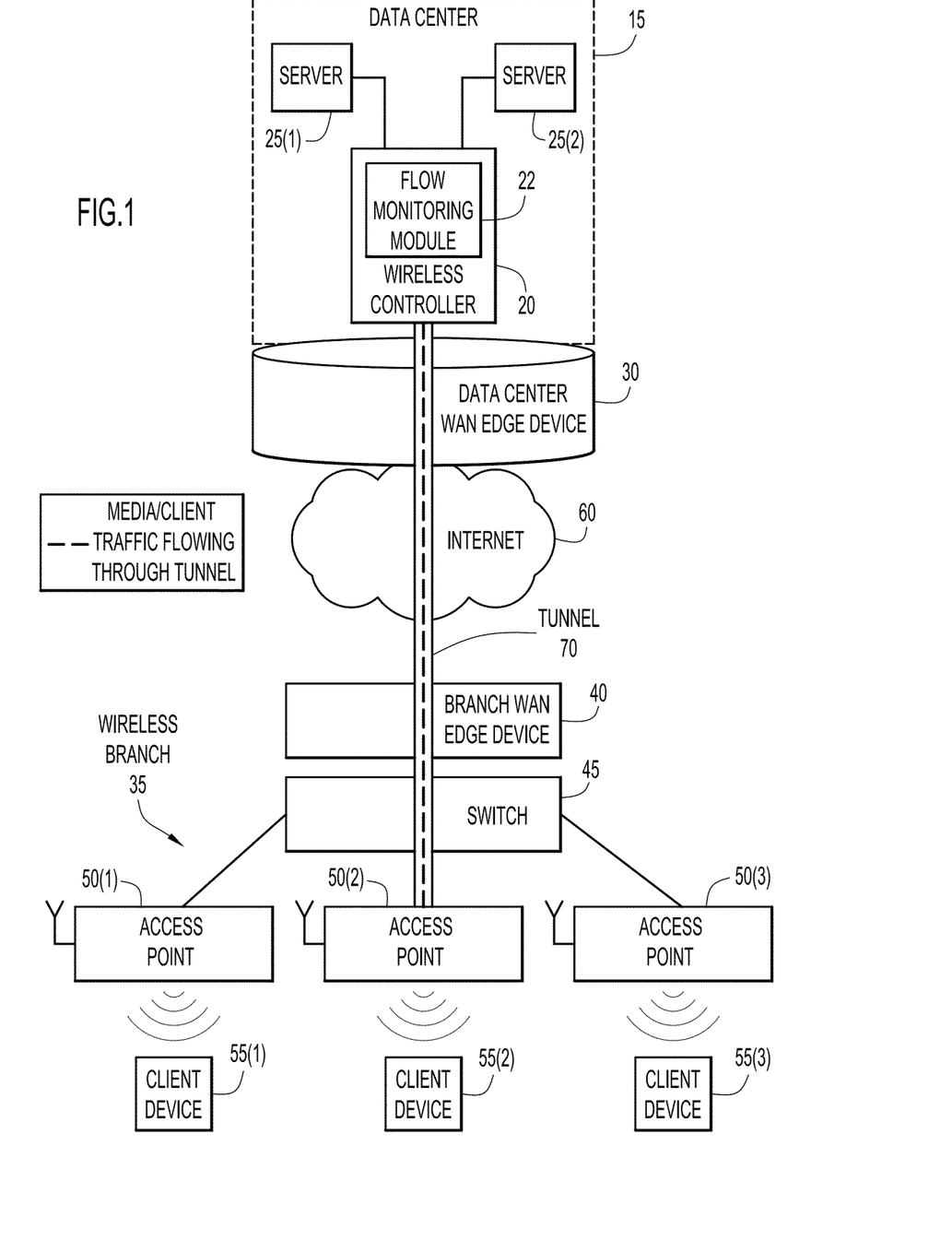
FIG. 1 is block diagram illustrating a computing network configured to provide wireless network flow monitoring capabilities in accordance with examples presented herein.

FIG. 1 is a schematic diagram of a network 10 configured to provide wireless network flow monitoring capabilities. As shown, the network comprises a data center 15 and a wireless branch 35. The data center 15 comprises a wireless controller 20, servers 25(1) and 25(2), and a data center Wide Area Network (WAN) edge device (e.g., edge router) 30. The wireless controller 20 comprises a flow monitoring module 22 configured to generate a management and provisioning protocol header for subsequent use by in-path networking devices for performance monitoring.

The wireless branch 35 comprises a branch WAN edge device 40, a switch 45, and access points 50(1)-50(3). Wireless devices 55(1), 55(2), and 55(3) communicate with access points 50(1), 50(2), and 50(3), respectively. The wireless branch 35 is connected to the data center 15 via a WAN, such as the Internet 60.

In the example of FIG. 1, the wireless controller 20 is configured to communicate with access point 50(2) using a management and provisioning protocol tunnel graphically represented by reference numeral 70 (e.g., a CAPWAP tunnel). Packets (e.g., packets comprising data, audio, video, etc.) transmitted by the wireless controller 20 or the access point 50(2) are encapsulated by a tunneling header. The tunneling header is used by in-path networking devices to forward the packet to the destination access point. In the examples presented herein, the tunneling header includes traffic session flow information as well as an application identifier (ID) that may be used by in-path networking devices to monitor the flow performance as well as for customization of services. That is, in contrast to conventional arrangements where traffic session flow information is carried within the packet (i.e., in the portion encapsulated by the tunneling header), in the examples presented herein the flow performance information is carried in the tunneling header of the encapsulated packet. Because in-path networking devices can inspect the traffic session flow information and the application ID contained in the tunneling header, the in-path networking devices can be used to evaluate flow performance of the packets sent between the wireless access points and the wireless controller. As described further below, the traffic session flow information and application ID obtained at the in-path networking devices may be used for performance monitoring of the native traffic, hop-by-hop monitoring end-to-end, providing differentiated services for end users, etc.

Figure 2A:
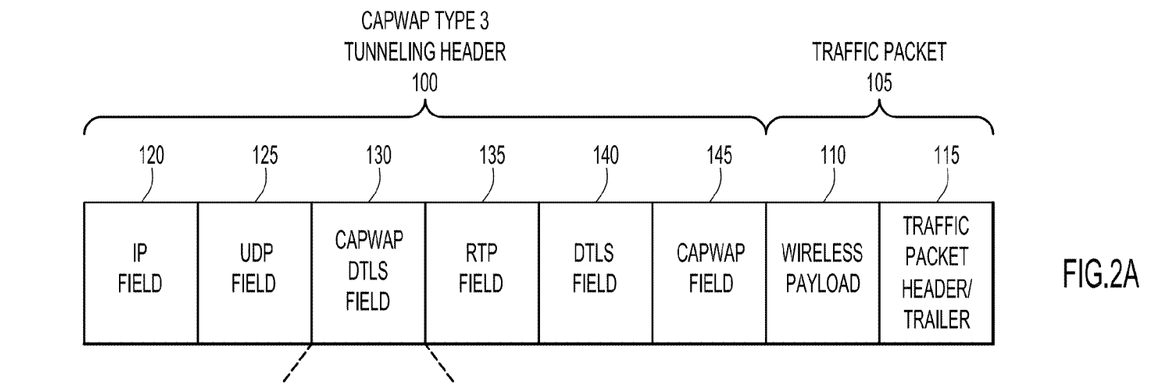
FIG. 2A is a schematic diagram illustrating a Control and Provisioning of Wireless Access Points (CAPWAP) tunneling header that includes traffic session flow information and an application identifier (ID) in accordance with examples presented herein.

The techniques presented herein provide for the creation of a new CAPWAP packet type (type 3) that allows a CAPWAP protocol to carry enough information, visible to the intermediate hubs, to allow data, voice and video jitters, drops, latency, bandwidth, throughput parameters to be collected per hub and per hub-by-hub basis. FIG. 2A is a schematic diagram illustrating an example CAPWAP type 3 tunneling header 100 in accordance with examples presented herein that includes traffic session flow information and the application ID. For ease of illustration, the CAPWAP type 3 tunneling header 100 of FIG. 2A will be described with reference to the network configuration of FIG. 1.

In general, the type 3 CAPWAP header 100 of FIG. 2A enhances the CAPWAP tunnel between a wireless controller 20 (e.g., a wireless Local Area Network (LAN) controller) and access point 55(1) such that software (and/or hardware) of the in-path devices can coordinate performance monitoring support within the CAPWAP session. This modification to the CAPWAP standard is backwards compatible with devices that do not support these features. The fields within the new header contain data values associated with timestamp, sequence numbering, and options for synchronization source (SSRC) data.

In the example of FIG. 2A, the type 3 CAPWAP tunneling header 100 is a data structure configured to be appended to (i.e., encapsulate) a CAPWAP message 105. In accordance with examples presented herein, the CAPWAP message 105 is referred to as a traffic packet that may be either a control packet or a data packet. Control packets carry signaling information while data packets carry user payloads. The wireless controller 20 may receive the traffic packet 105 (i.e., CAPWAP message) from another device (e.g., server 25(1)) or generate the traffic packet 105. The wireless controller 20 generates the CAPWAP tunneling header 100 based, at least in part, on information obtained from the traffic packet 105.

In the specific example of FIG. 2A, the traffic packet 105 comprises a wireless payload 110 and a header/trailer 115 that carries control information associated with the wireless payload 110. The wireless payload 110 in FIG. 2A is media content (i.e., audio and/or video), but may comprise data of other types.

In the example of FIG. 2A, the CAPWAP tunneling header 100 includes an Internet Protocol (IP) field 120, a UDP field 125, a CAPWAP DTLS field 130, an RTP field 135, a DTLS field 140, and a CAPWAP field 145. The IP field 120, UDP field 125, DTLS field 140, and CAPWAP field 145 are present in conventional CAPWAP tunneling headers and their functions/contents are not described herein. However, the CAPWAP DTLS field 120 and the RTP field 135 are fields that are not present in conventional CAPWAP tunneling headers. These are the fields that enable in-path networking devices to perform flow monitoring.

The RTP field 135 is an example of traffic session flow information carried in the CAPWAP tunneling header 100. That is, the RTP field 135 includes flow information associated with the media payload 110. As such, in-path wireless network devices supporting the tunnel 70 (e.g., data center edge device 30, branch edge device 40, and/or switch 45) are configured to monitor the RTP information in RTP field 135 to identify, for example, jitter, roundtrip time (RTT), and packet losses issues for subsequent use by an administrator. The RTP field 135 may be generated/populated by the wireless controller 20 using information obtained from the traffic packet 105.

Figure 2B:
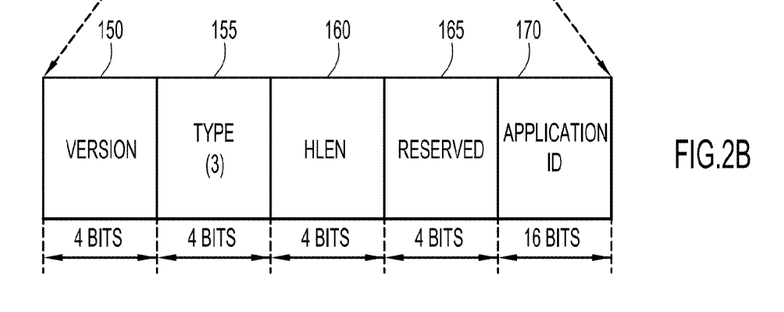
FIG. 2B illustrates the details of a CAPWAP Datagram Transport Layer Security (DTLS) field in the CAPWAP tunneling header of FIG. 2A.

FIG. 2B is a schematic diagram illustrating further details of the CAPWAP DTLS field 130. In the specific example of FIG. 2B, the CAPWAP DTLS field 130 includes four bits identifying the header version 150, four bits identifying the header type (e.g., CAPWAP type 3) 155, four bits for Header Length (HLEN) 160, four reserved bits 165, and sixteen (16) bits for an application ID 170. The HLEN 160 includes the size of the CAPWAP DTLS field 130 and the size of the RTP field 135. The application ID 170 identifies the application type or uniquely identifies the application that is running over the tunnel 70. That is, the application ID 170 identifies the application associated with the wireless payload 110. The application ID 170 may be determined and added to the CAPWAP DTLS field 130 by the wireless controller 20 using information obtained from the traffic packet 105. In one example, the application ID 170 is a Next Generation Network-Based Application Recognition (NBAR2) application ID.

As noted, the RTP field 135 and application ID field 170 are merely examples of traffic session flow information and metadata attributes, respectively, that may be present in the modified CAPWAP tunneling header 100. It is to be appreciated that, in alternative examples, different types of traffic session flow information and metadata attributes may be carried in the CAPWAP tunneling header 100 in place of, or in addition to, the RTP field 135 sand/or application ID field 170. For example, the other metadata attributes that may be carried in a CAPWAP tunneling header in accordance with examples presented herein include, but are not limited to, application media type, application name, application tag, application group, application category and/or subcategory, application device class, end point model, application traffic type, application transport type, application multiplex type, application vendor, application version, payload type, etc.

According to RFC 5415, CAPWAP protocol packets may be plain text (type 1 headers) or DTLS encrypted (type 2). FIGS. 2A and 2B illustrate an example in which the type 3 header is DTLS encrypted. It is to be appreciated that the DTLS encryption may be omitted in other examples presented herein.

As noted above, FIGS. 2A and 2B illustrate one type of a tunneling header in which traffic session flow information and an application ID are included therein. As explained above, because the traffic session flow information and an application ID are in the tunneling header so as to be visible to in-path networking devices (i.e., devices through which tunnel 70 passes and that do not decapsulate the tunneled packets). The visibility of the traffic session flow information and an application ID to the in-path networking devices extends features/capabilities into the wireless industry that have previously not been available. These wireless features/capabilities are described further below with reference to the examples of FIGS. 3A-3C. For ease of illustration, the examples of FIGS. 3A-3C refer to the type 3 CAPWAP tunneling header 100 and traffic packet 105 of FIGS. 2A and 2B.

Figure 3A:
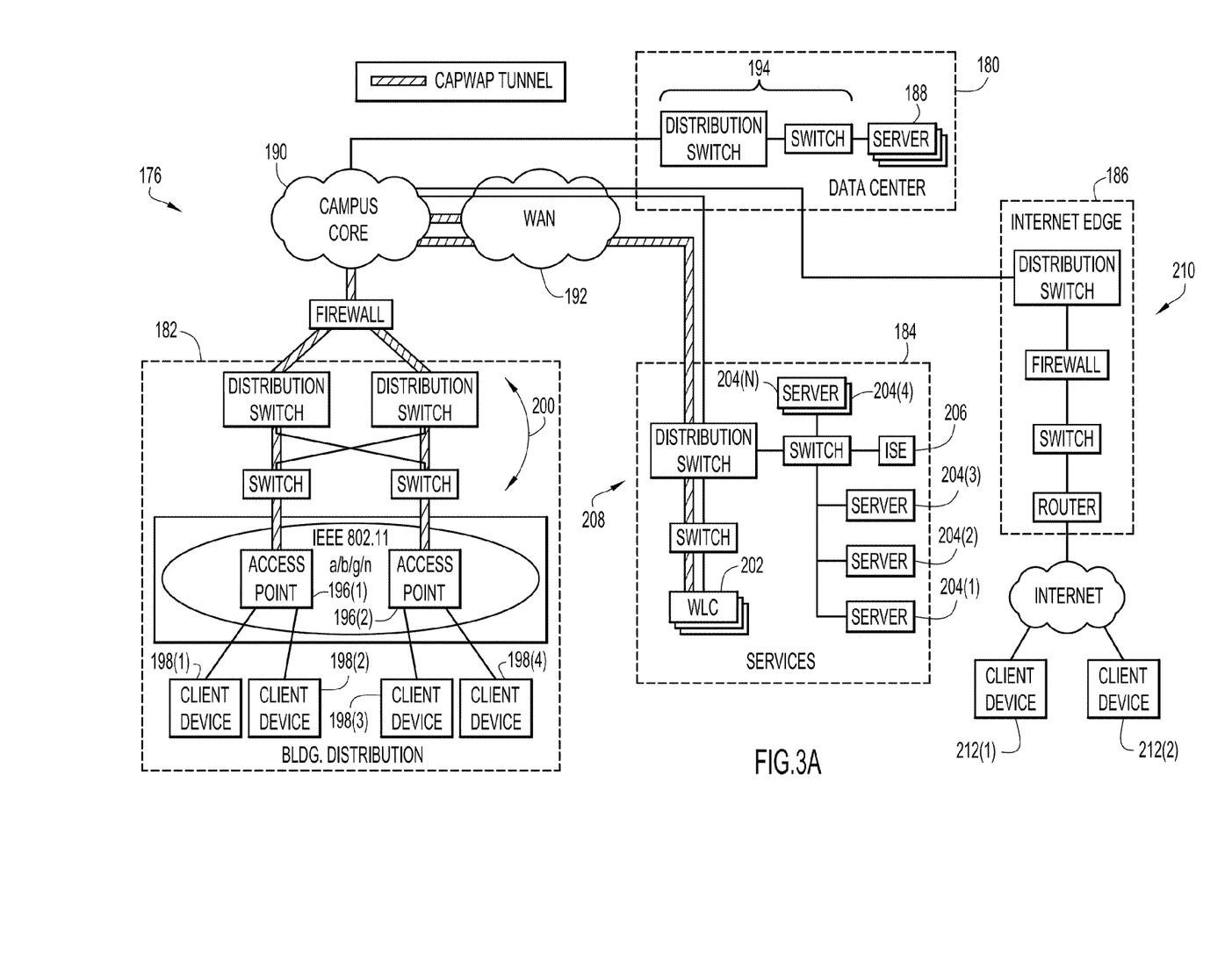
FIGS. 3A-3C are diagrams illustrating wireless network flow monitoring capabilities in accordance with examples presented herein.

FIG. 3A illustrates a first scenario where the information in RTP field 135 (i.e., the traffic session flow information) is used for performance monitoring of certain flows. FIG. 3A illustrates a network 176 comprising a data center 180, a building distribution segment 182, a services segment 184, and an Internet edge segment 186.

The data center 180 includes application and file servers 188 connected to a campus core 190 and WAN 192 via networking devices 194. The building distribution segment 182 includes a first access point 196(1) and a second access point 196(2) providing wireless connectively to various client devices. Access point 196(1) provides wireless connectivity to client devices 198(1) and 198(2), while access point 196(2) provides wireless connectivity to client devices 198(3) and 198(4). The access points 196(1) and 196(2) are connected to the campus core 190 and WAN 192 via networking devices 200.

The services segment 184 includes one or more wireless controllers 202, various service servers 204(1)-204(N) (e.g., Dynamic Host Configuration Protocol (DHCP) servers, Domain Name System (DNS) servers, security servers, etc.), and an Identify Services Engine (ISE) 206 that provides context awareness and network-based enforcement. The wireless controllers (also known as wireless local area network controls or WLCs) 202, service servers 204(1)-204(N) and the Identity Services Engine (ISE_206 are connected to campus core 190 and WAN 192 via networking devices 208. The Internet Edge segment 186 comprises a plurality of networking devices 210 that connect remote client devices 212(1) and 212(2) to the campus core 190 and WAN 192.

In the example of FIG. 3A, CAPWAP tunnels are created between one or more of the wireless controllers 202 and each of the access points 196(1) and 196(2). Specific types of traffic traveling through the tunnels may be monitored to validate an application's quality (e.g., videoconferencing, desktop, voice, Transmission Control Protocol (TCP), RTP application, etc.). More specifically, traffic packets passing through the CAPWAP tunnels are encapsulated with the CAPWAP type 3 tunneling header 100 of FIGS. 2A and 2B. The various in-path networking devices (i.e., networking devices 200 and 208) can monitor the performance of specific types of traffic using the information in RTP field 135 of the CAPWAP type 3 tunneling header 100.

In certain examples, the performance monitoring features at the networking devices 200 and 208 provide active measurements and Network Management System (NMS) messages (e.g., Simple Network Management Protocol (SNMP), Syslog alarms, etc.) when a media session degrades and a (configurable) threshold crossing event is detected. Media Services Interface (MSI) software can provide performance measurements from end-point devices, so both network devices and end-points/applications can be monitored. The performance monitoring functionality of FIG. 3A integrates with Flow Metadata (FMD), so that metadata attributes can be exported to a NMS along with performance monitoring packet statistics.

Figure 3B:
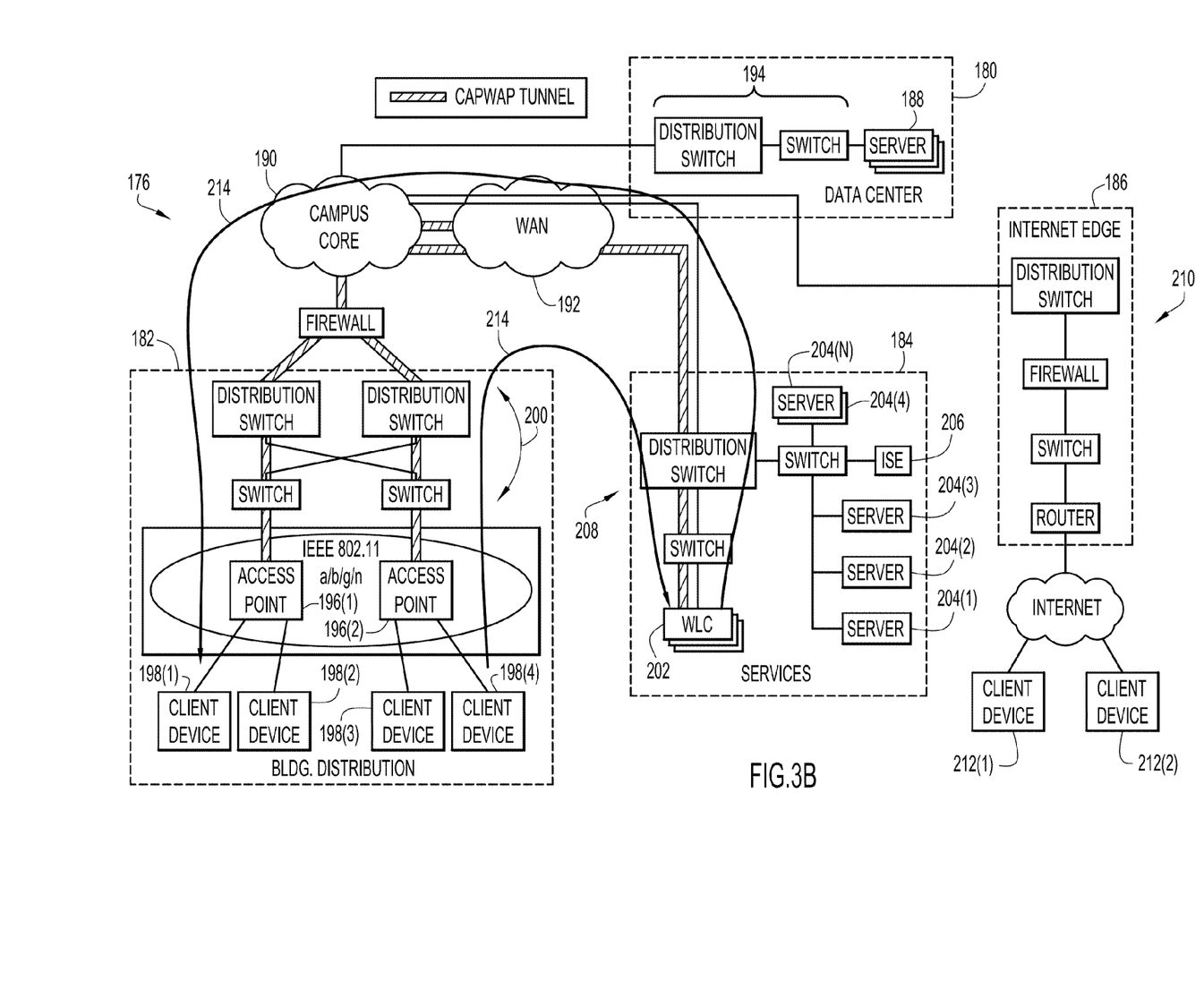

FIG. 3B illustrates a second scenario where the information in RTP field 135 (i.e., the traffic session flow information) is used for fault/error isolation. The network 176 of FIG. 3B has the same arrangement as in FIG. 3A and CAPWAP tunnels are created between one or more of the wireless controllers 202 and each of the access points 196(1) and 196(2). In the specific example of FIG. 3B, client device 198(4) initiates a Jabber Video call with client device 198(1). The Jabber Video call is represented in FIG. 3B by line 214. As shown, the Jabber Video call 214 passes through, and is controlled by, a wireless controller 202.

Troubleshooting a complex network connection such as Jabber Video call 214 can be challenging. In conventional arrangements, a network administrator uses the process of elimination by starting at one end of the network to check each interface without always knowing the actual path through the network 176. That is, the network 176 may include segments of meshed nodes (e.g., in building distribution segment 182) where packets may take different paths depending on a number of different factors. The inclusion of the RTP field 135 in the CAPWAP type 3 tunneling header 100 enables the use of Mediatrace at the in-path networking devices 200 and 208 to streamline the troubleshooting process. More specifically, Mediatrace uses the information in the RTP field 135 to provide packet statistics at each hop in a flows path. This hop-by-hop analysis enables a network administrator to quickly identify problems along the actual path and often providing enough information to determine the root-cause.

Figure 3C:
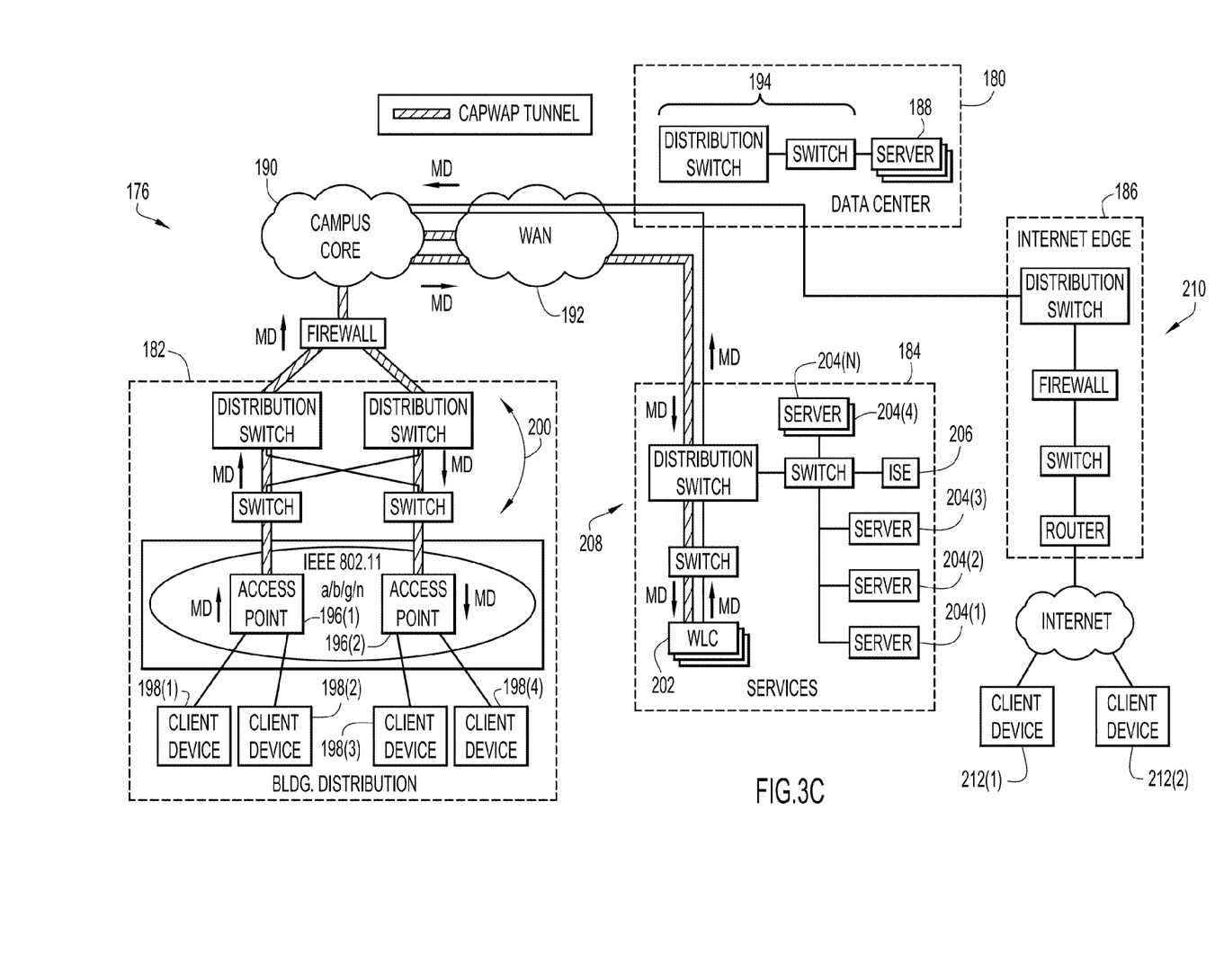

FIG. 3C illustrates a third scenario where the application ID in CAPWAP DTLS field 130 is used for application visibility and customization of services. The network 176 of FIG. 3B has the same arrangement as in FIG. 3A and CAPWAP tunnels are created between one or more of the wireless controllers 202 and each of the access points 196(1) and 196(2). Similar to the example of FIG. 3B, client device 198(4) initiates a Jabber Video call with client device 198(1) that passes through a wireless controller 202. For ease of illustration, the Jabber Video call is not shown in FIG. 3C.

As noted above, the CAPWAP type 3 tunneling header 100 includes an application ID 170. In the example of FIG. 3C, endpoints and applications pass application ID (metadata (MD) attributes) into the network 176 using MSI software so the network can apply QoS, enable performance monitoring policies, provide policy-based routing decisions, provide application visibility to NMS, etc., based on the application ID 170 carried in the header of tunneled traffic. End-Points use Flow Metadata framework to transport (e.g., Resource Reservation Protocol (RSVP) messages) metadata attributes across the network and notify downstream devices of metadata attributes. Each device can use this information to make policy decisions on how to treat each media flow. In general, the inclusion of the application ID 170 in the tunneling header 100 allows application visibility for encrypted flows, which would be otherwise impossible. That is, network management is provided where the applications running in the network are identified and QoS adjustments may be made to achieve better user experience based on the type or actial application in use. For example, the techniques may be used to provide better service to a user watching a video over a user who is surfing the web.

Figure 4:
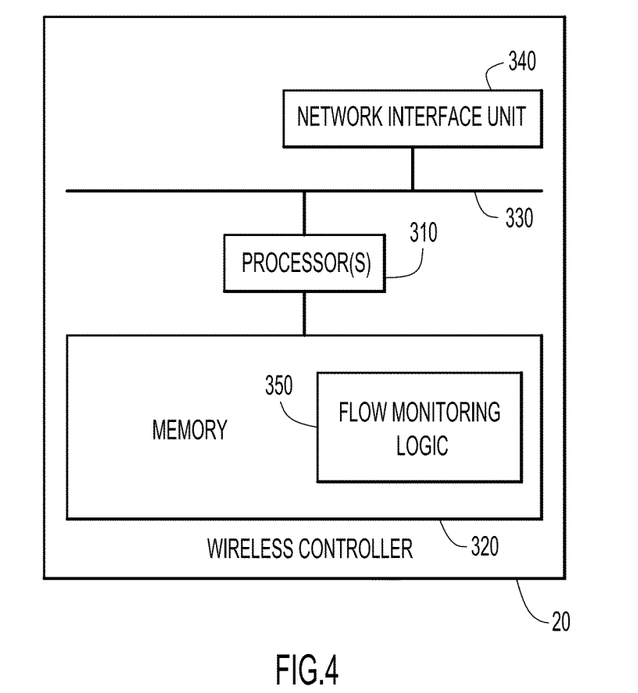
FIG. 4 is a block diagram of a wireless controller configured to generate a tunneling header that includes traffic session flow information and an application ID in accordance with examples presented herein.

FIG. 4 is a block diagram of a wireless controller 20 of FIG. 1 configured to generate a CAPWAP tunneling header (e.g., CAPWAP tunneling header 100 of FIGS. 2A and 2B) that includes traffic session flow information and an application ID in accordance with examples presented herein.

The wireless controller 20 includes one or more processors 310, memory 320, a bus 330 and a network interface unit 340. The processor 310 may be a microprocessor or microcontroller. The network interface unit 340 facilitates network communications between the wireless controller 20 and network nodes (e.g., servers 25(1) and 25(2), access points 50(1)-50(3), etc.). The processor 310 executes instructions associated with software stored in memory 320. Specifically, the memory 320 stores flow monitoring logic 350 that, when executed by the processor 310, causes the processor 310 to generate a CAPWAP type 3 or other type of tunneling header that includes traffic session flow information and an application ID. The flow monitoring logic 350 (or another software element) may be executed by the processor 310 to encapsulate a traffic packet with the tunneling header that includes traffic session flow information and an application ID and transmit the resulting encapsulated packet through a tunnel to an access point.

The memory 320 may comprise read only memory (ROM), random access memory (RAM), magnetic disk storage media devices, optical storage media devices, flash memory devices, electrical, optical, or other physical/tangible memory storage devices. In general, the memory 320 may comprise one or more tangible (non-transitory) computer readable storage media (e.g., a memory device) encoded with software comprising computer executable instructions and when the software is executed (by the processor 310) it is operable to perform the operations described herein.

Figure 5:
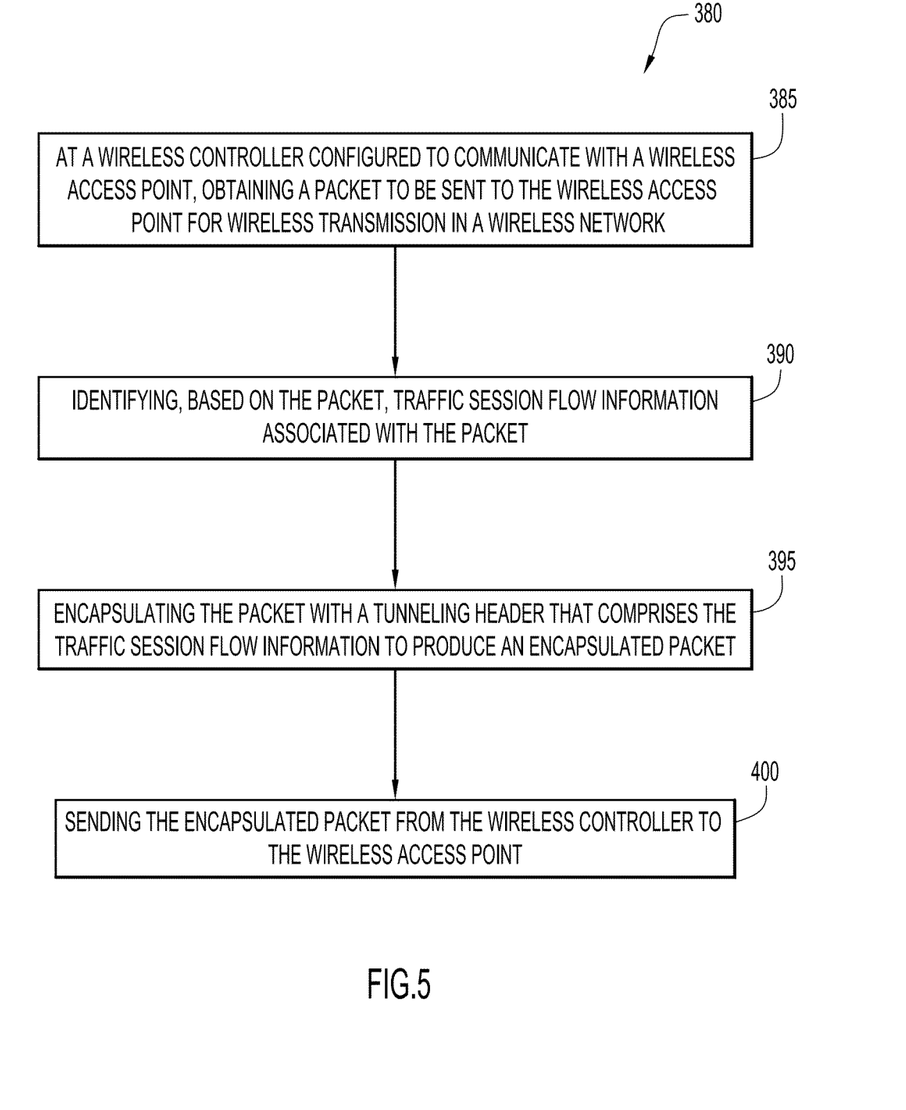
FIG. 5 is a flowchart of a method in accordance with examples presented herein.

FIG. 5 is a flowchart of a method 380 in accordance with examples presented herein. The method 380 begins at 385 where a wireless controller that is configured to communicate with a wireless access point obtains a packet to be sent to the wireless access point for wireless transmission in a wireless network. At 390, the wireless controller identifies, based on the packet, traffic session flow information associated with the traffic packet. At 395, the wireless controller encapsulates the packet with a tunneling header that comprises the traffic session flow information to produce an encapsulated tunneling packet. At 400, the wireless controller sends the encapsulated packet to the wireless access point.

In summary, the techniques presented herein enable per-hop or per-path performance monitoring of management and provisioning protocol tunneled packets, such as a CAPWAP protocol packets initially designed and designated for provisioning and management only. In specific examples, a type 3 CAPWAP header is provided that is designated for plain text as well as DTLS encapsulated per-hop performance monitoring. Thus, a method is provided to manipulate the CAPWAP header to accommodate RTP header information that can be leveraged for per-hop or per-path performance monitoring within a Medianet media monitoring multi-hop network.

In the modified CAPWAP specific encapsulations presented herein, the header information is used by a downstream network device or network analyzer to determine performance metrics for the network without decrypting the encrypted packet and without altering the content of the packet which can cause the packet to be dropped on arrival by the recipient device. This enables per hop performance monitoring over wireless networks, e.g. Wi-Fi networks, as well as per path (hop-by-hop) performance tracing capabilities over Wi-Fi networks. In so doing, the reach of the Medianet is expanded from wired to wireless networks. Network administrators can deliver differentiated services for users without creating new protocols or injecting synthetic traffic into the wireless network. These techniques optimize the existing type 0 preambles on intermediate systems where deep packet inspection can be avoided to derive instrumentation data. Moreover, these techniques expose instrumentation data of the DTLS packet that can be used for performance analysis at each network device hop.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method comprising:
   at a wireless controller configured to communicate with a wireless access point, obtaining a packet to be sent to the wireless access point for wireless transmission in a wireless network, wherein the packet comprises a payload that includes media content comprising one or more of audio content or video content;
   identifying, based on the packet, traffic session flow information associated with the media content within the packet payload, wherein the traffic session flow information enables a downstream network device to determine performance metrics associated with the media content within the packet;
   encapsulating the packet with an access point management and provisioning protocol tunneling header that includes a Real-Time Transport Protocol (RTP) field to produce an encapsulated packet;
   inserting, in the RTP field, traffic session flow information associated with the media content, wherein the traffic session flow information in the RTP field is accessible to downstream network devices without decapsulating the packet payload and enables the downstream network devices to determine performance metrics associated with the media content within the packet payload; and
   sending the encapsulated packet from the wireless controller to the wireless access point.

2. The method of claim 1, wherein the access point management and provisioning protocol tunneling header also includes a Datagram Transport Layer Security (DTLS) field, and wherein the method further comprises:
   identifying, based on the packet, an application identifier (ID) for an application associated with the media content in the payload of the packet; and
   inserting the application ID into the DTLS field of the access point management and provisioning protocol tunneling header.

3. The method of claim 2, further comprising:
   examining, at a networking device in a path of the encapsulated packet between the wireless controller and the wireless access point, the application ID in the access point management and provisioning protocol tunneling header for application visibility and customization of services.

4. The method of claim 1, wherein encapsulating the packet with the access point management and provisioning protocol tunneling header comprises:
   encapsulating the packet with a Control And Provisioning of Wireless Access Points (CAPWAP) header.

5. The method of claim 4, wherein the CAPWAP header comprises:
   an Internet Protocol field, a User Datagram Protocol field, a CAPWAP DTLS field, and a CAPWAP field.

6. The method of claim 5, wherein the CAPWAP DTLS field comprises:
   a Version field, Type field, Header Length (HLEN) field, Reserved field and an application ID field.

7. The method of claim 1, further comprising:
   examining, at a networking device in a path of the encapsulated packet between the wireless controller and the wireless access point, the traffic session flow information associated with the media content in the RTP field of the access point management and provisioning protocol tunneling header for performance monitoring of the media content.

8. The method of claim 1, further comprising:
   examining, at a networking device in a path of the encapsulated packet between the wireless controller and the wireless access point, the traffic session flow information associated with the media content in the RTP field of the access point management and provisioning protocol tunneling header to isolate network errors affecting quality of service of delivery of the media content.

9. An apparatus comprising:
   a network interface unit configured to enable communications over a network; and
   a processor coupled to the network interface unit, and configured to:
     obtain a packet to be sent, via the network to a wireless access point for wireless transmission in a wireless network, wherein the packet comprises a payload that includes media content comprising one or more of audio content or video content,
     identify, based on the packet, traffic session flow information associated with the media content within the packet payload, wherein the traffic session flow information enables a downstream network device to determine performance metrics associated with the media content within the packet,
     encapsulate the packet with an access point management and provisioning protocol tunneling header that includes a Real-Time Transport Protocol (RTP) field to produce an encapsulated packet, inserting, in the RTP field, the traffic session flow information associated with the media content, wherein the traffic session flow information in the RTP field is accessible to downstream network devices without decapsulating the packet payload and enables the downstream network devices to determine performance metrics associated with the media content within the packet payload, and send the encapsulated packet to the wireless access point via the network.

10. The apparatus of claim 9, wherein the access point management and provisioning protocol tunneling header also includes a Datagram Transport Layer Security (DTLS) field, and wherein the processor is further configured to:

identify, based on the packet, an application identifier (ID) for an application associated with the media content in the payload of the packet; and insert the application ID into the DTLS field of the access point management and provisioning protocol tunneling header.

11. The apparatus of claim 9, wherein to encapsulate the packet with the access point management and provisioning protocol tunneling header, the processor is configured to:

encapsulate the packet with a Control And Provisioning of Wireless Access Points (CAPWAP) header.

12. The apparatus of claim 11, wherein the CAPWAP header comprises:

an Internet Protocol field, a User Datagram Protocol field, a CAPWAP DTLS field, and a CAPWAP field.

13. The apparatus of claim 12, wherein the CAPWAP DTLS field comprises:

a Version field, Type field, Header Length (HLEN) field, Reserved field and an application ID field.

14. One or more non-transitory computer readable storage media encoded with software comprising computer executable instructions and when the software is executed operable to:

obtain a packet to be sent from a wireless controller to a wireless access point for wireless transmission in a wireless network, wherein the packet comprises a payload that includes media content comprising one or more of audio content or video content;

identify, based on the packet, traffic session flow information associated with the media content within the packet payload, wherein the traffic session flow information enables a downstream network device to determine performance metrics associated with the media content within the packet;

encapsulate the packet with an access point management and provisioning protocol tunneling header that includes a Real-Time Transport Protocol (RTP) field to produce an encapsulated packet;

insert, in the RTP field, the traffic session flow information associated with the media content, wherein the traffic session flow information in the RTP field is accessible to downstream network devices without decapsulating the packet payload and enables the downstream network devices to determine performance metrics associated with the media content within the packet payload; and send the encapsulated packet from the wireless controller to the wireless access point.

15. The non-transitory computer readable storage media of claim 14, wherein the access point management and provisioning protocol tunneling header also includes a Datagram Transport Layer Security (DTLS) field, and wherein the non-transitory computer readable storage media further comprises instructions operable to:

identify, based on the packet, an application identifier (ID) for an application associated with the media content in the payload of the packet; and insert the application ID into the DTLS field of the access point management and provisioning protocol tunneling header.

16. The non-transitory computer readable storage media of claim 15, further comprising instructions operable to:

examine, at a networking device in a path of the encapsulated packet between the wireless controller and the wireless access point, the application ID in the access point management and provisioning protocol tunneling header for application visibility and customization of services.

17. The non-transitory computer readable storage media of claim 14, wherein the instructions operable to encapsulate the packet with the access point management and provisioning protocol tunneling header comprise instructions operable to:

encapsulate the packet with a Control And Provisioning of Wireless Access Points (CAPWAP) header.

18. The non-transitory computer readable storage media of claim 17, wherein the CAPWAP header comprises:

an Internet Protocol field, a User Datagram Protocol field, a CAPWAP DTLS field, and a CAPWAP field.

19. The non-transitory computer readable storage media of claim 18, wherein the CAPWAP DTLS field comprises:

a Version field, Type field, Header Length (HLEN) field, Reserved field and an application ID field.

20. The non-transitory computer readable storage media of claim 14, further comprising instructions operable to:

examine, at a networking device in a path of the encapsulated packet between the wireless controller and the wireless access point, the traffic session flow information associated with the media content in the RTP field of the access point management and provisioning protocol tunneling header for performance monitoring.

21. The non-transitory computer readable storage media of claim 14, further comprising instructions operable to:

examine, at a networking device in a path of the encapsulated packet between the wireless controller and the wireless access point, the traffic session flow information associated with the media content in the RTP field of the access point management and provisioning protocol tunneling header to isolate network errors affecting quality of service of delivery of the media content.

* * * * *